US010762876B2

(12) United States Patent
Taki et al.

(10) Patent No.: US 10,762,876 B2
(45) Date of Patent: Sep. 1, 2020

(54) INFORMATION PROCESSING APPARATUS AND CONTROL METHOD

(71) Applicant: SONY CORPORATION, Tokyo (JP)

(72) Inventors: Yuhei Taki, Kanagawa (JP); Taizo Shirai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/291,148

(22) Filed: Mar. 4, 2019

(65) Prior Publication Data
US 2019/0197992 A1 Jun. 27, 2019

Related U.S. Application Data

(63) Continuation of application No. 16/018,352, filed on Jun. 26, 2018, now Pat. No. 10,262,630, which is a
(Continued)

(30) Foreign Application Priority Data

Aug. 21, 2014 (JP) .................................. 2014-168342

(51) Int. Cl.
*G09G 5/14* (2006.01)
*G09G 5/391* (2006.01)
(Continued)

(52) U.S. Cl.
CPC .............. *G09G 5/14* (2013.01); *G06F 3/012* (2013.01); *G06F 3/013* (2013.01); *G06F 3/048* (2013.01);
(Continued)

(58) Field of Classification Search
None
See application file for complete search history.

(56) References Cited

U.S. PATENT DOCUMENTS 5,107,443 A 4/1992 Smith et al.
2009/0141895 A1* 6/2009 Anderson ............... G06F 21/84
380/252
(Continued)

FOREIGN PATENT DOCUMENTS

AU 2010221722 A1 8/2011
EP 2235713 A1 10/2010
(Continued)

OTHER PUBLICATIONS

Notice of Allowance and Fees Due for U.S. Appl. No. 16/018,352, dated Mar. 7, 2019, 05 pages.
(Continued)

*Primary Examiner* — Michelle Chin
(74) *Attorney, Agent, or Firm* — Chip Law Group

(57) ABSTRACT

Provided is an information processing apparatus, including: a line-of-sight detection unit configured to detect lines of sight of a plurality of users with respect to presentation information; and an area determination unit configured to determine, on the basis of the detected lines of sight of the plurality of users, a shared area that is visually recognized by the plurality of users to share information and a confidential area that is not visually recognized by another user to keep information of each user confidential.

11 Claims, 13 Drawing Sheets

Related U.S. Application Data continuation of application No. 15/503,446, filed as application No. PCT/JP2015/064769 on May 22, 2015, now Pat. No. 10,032,437.

(51) Int. Cl.
*G06F 3/048* (2013.01)
*G06F 3/01* (2006.01)
*G06F 3/0484* (2013.01)

(52) U.S. Cl.
CPC ......... *G09G 5/391* (2013.01); *G06F 3/04845* (2013.01); *G06F 2203/04803* (2013.01); *G09G 2340/0407* (2013.01); *G09G 2354/00* (2013.01); *G09G 2358/00* (2013.01)

(56) References Cited

U.S. PATENT DOCUMENTS

| | | | | |
|---|---|---|---|---|
| 2010/0124363 | A1* | 5/2010 | Ek | G06F 21/32 382/118 |
| 2010/0205667 | A1 | 8/2010 | Anderson et al. | |
| 2011/0025712 | A1* | 2/2011 | Ikeda | G06F 3/0488 345/635 |
| 2013/0131978 | A1* | 5/2013 | Han | G01C 21/3638 701/436 |
| 2013/0286223 | A1 | 10/2013 | Latta et al. | |
| 2014/0002419 | A1 | 1/2014 | Thorson et al. | |
| 2014/0013437 | A1 | 1/2014 | Anderson et al. | |

FOREIGN PATENT DOCUMENTS

| | | | |
|---|---|---|---|
| EP | 2320311 | A1 | 5/2011 |
| EP | 2394235 | A2 | 12/2011 |
| JP | 3036758 | B2 | 4/2000 |
| JP | 2000-235352 | A | 8/2000 |
| JP | 2000235352 | A * | 8/2000 |
| JP | 2010-018770 | A | 1/2010 |
| JP | 2010-021240 | A | 1/2010 |
| JP | 2011-197537 | A | 10/2011 |
| WO | 2009/073584 | A1 | 6/2009 |
| WO | 2010/018770 | A1 | 2/2010 |
| WO | 2010/021240 | A1 | 2/2010 |
| WO | 2010/057683 | A1 | 5/2010 |
| WO | 2010/101697 | A2 | 9/2010 |
| WO | 2014/003924 | A1 | 1/2014 |

OTHER PUBLICATIONS

Notice of Allowance and Fees Due for U.S. Appl. No. 16/018,352, dated Dec. 4, 2018, 09 pages.
Non-Final Rejection for U.S. Appl. No. 16/018,352, dated Jul. 26, 2018, 14 pages.
Extended European Search Report of EP Patent Application No. 15834175.0, dated Mar. 6, 2018, 11 pages.
International Search Report and Written Opinion of PCT Application No. PCT/JP2015/064769, dated Jul. 14, 2015, 06 pages of English Translation and 06 pages of ISRWO.
International Preliminary Report on Patentability of PCT Application No. PCT/JP2015/064769, dated Mar. 2, 2017, 07 pages of English Translation and 05 pages of IPRP.
Notice of Allowance and Fees Due for U.S. Appl. No. 15/503,446, dated Mar. 28, 2018, 07 pages.
Non-Final Rejection for U.S. Appl. No. 15/503,446, dated Nov. 3, 2017, 08 pages.
Office Action for CN Patent Application No. 201580043525.6, dated Sep. 30, 2019, 07 pages of Office Action and 10 pages of English Translation.

* cited by examiner

INFORMATION PROCESSING APPARATUS AND CONTROL METHOD

CROSS-REFERENCE TO RELATED APPLICATIONS

The present application is a continuation application of U.S. patent application Ser. No. 16/018,352, filed Jun. 26, 2018, which is a continuation application of U.S. patent application Ser. No. 15/503,446, filed Feb. 13, 2017, which is a National Stage Entry of PCT/JP2015/064769, filed May 22, 2015, and claims the benefit of priority from Japanese Priority Patent Application JP 2014-168342 filed in the Japan Patent Office on Aug. 21, 2014, the entire contents of which are hereby incorporated by reference.

TECHNICAL FIELD

The present disclosure relates to an information processing apparatus and a control method.

BACKGROUND ART

In recent years, there have been increased use cases where a plurality of people perform simultaneous operation or simultaneously look at a document. For example, a plurality of people surround a large screen (wall-surface display unit, electronic board, or the like) or a table top (table-type image display device) and conduct a meeting while looking at a document displayed on an image display device.

Regarding such an image display device that can be viewed by a plurality of people, for example, Patent Literatures 1 and 2 described below are proposed. Specifically, there are proposed techniques for, in the case where a table-type image display device displays an object serving as a document of a meeting on a display and participants of the meeting have discussions on the basis of the same object, displaying the object while enlarging the object (Patent Literature 1) or separating the object (Patent Literature 2) so that the participant who have discussions can clearly look at the object.

CITATION LIST

Patent Literature

Patent Literature 1:
Japanese Translation of PCT Patent Republication WO2010/021240
Patent Literature 2:
Japanese Translation of PCT Patent Republication WO2010/018770

DISCLOSURE OF INVENTION

Technical Problem

Herein, in an environment in which a plurality of people perform simultaneous operation, interaction based on the plurality of people such as joint viewing of an object is important, whereas it is also important to hide security information from other viewers. For example, it is necessary that confidential information, such as an input screen of a personal identification number (PIN) code and content of an email, cannot be easily viewed even in the case where a plurality of people look at a screen.

However, any of the conventional techniques described above does not mention keeping security information confidential.

In view of this, the present disclosure proposes an information processing apparatus and a control method capable of differentiating between an area that can be visually recognized only by a specified user and an area that can be visually recognized by all users on an image presentation surface that is simultaneously viewed by a plurality of people.

Solution to Problem

According to the present disclosure, there is provided an information processing apparatus, including: a line-of-sight detection unit configured to detect lines of sight of a plurality of users with respect to presentation information; and an area determination unit configured to determine, on the basis of the detected lines of sight of the plurality of users, a shared area that is visually recognized by the plurality of users to share information and a confidential area that is not visually recognized by another user to keep information of each user confidential.

According to the present disclosure, there is provided a control method including: detecting lines of sight of a plurality of users with respect to presentation information; and determining, on the basis of the detected lines of sight of the plurality of users, a shared area that is visually recognized by the plurality of users to share information and a confidential area that is not visually recognized by another user to keep information of each user confidential.

Advantageous Effects of Invention

As described above, according to the present disclosure, it is possible to differentiate between an area that can be visually recognized only by a specified user and an area that can be visually recognized by all users on an information presentation surface that is simultaneously viewed by a plurality of people.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
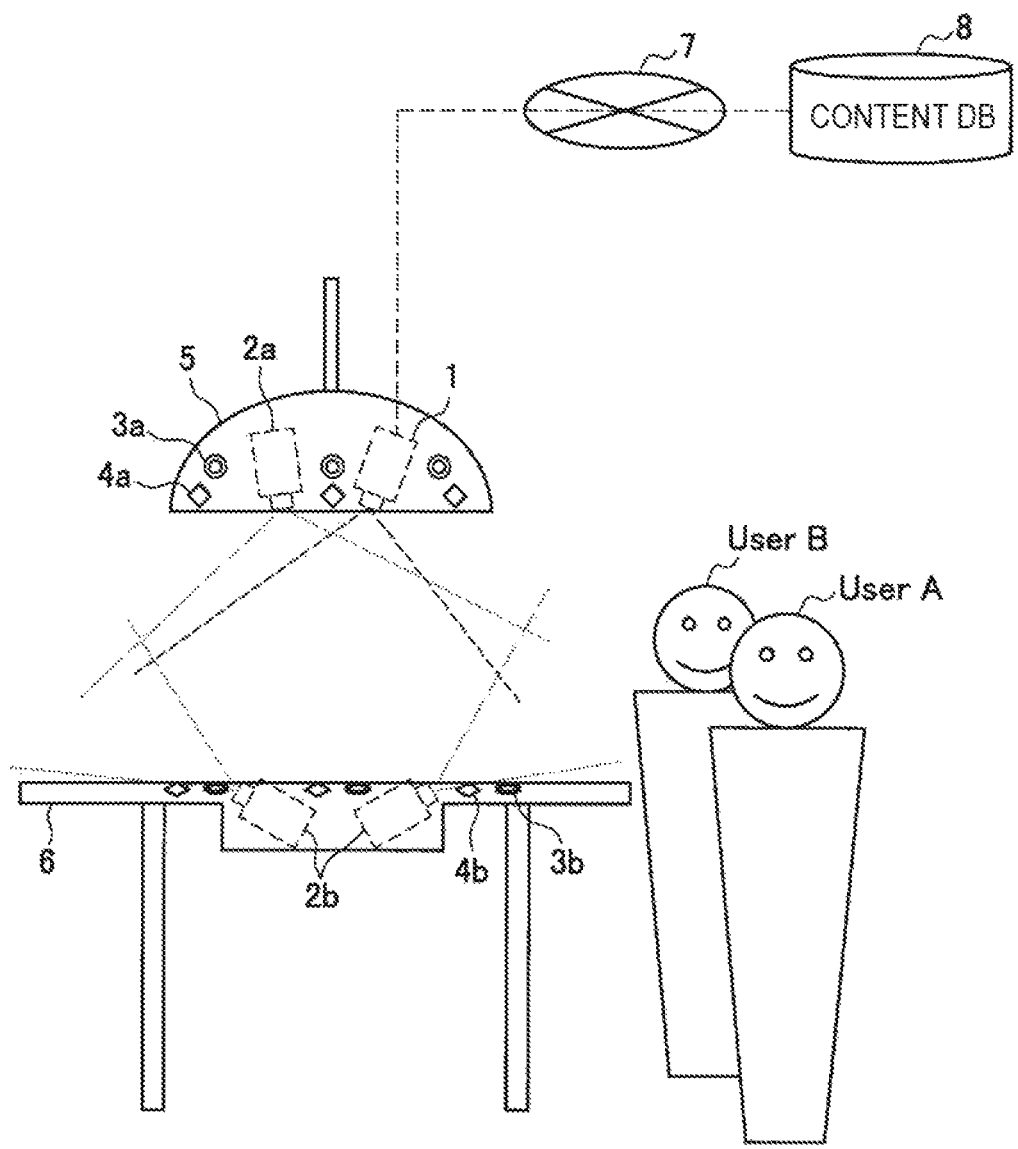
FIG. 1 is a diagram showing an outline of a control system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be provided in the following order.
1. Outline of control system according to embodiment of present disclosure
2. Basic configuration
3. Operation processing
3-1. Readable area determination processing
3-2. Shared/confidential area determination processing
4. Presentation control example
4-1. Presentation control of confidential information
4-2. Movement of content between areas
4-3. Hiding/deleting of confidential information when content is moved
5. Modification example
6. Conclusion 1. Outline of Control System According to Embodiment of Present Disclosure An outline of a control system according to an embodiment of the present disclosure will be described with reference to FIG. 1 and FIG. 2. In the example shown in FIG. 1, a plurality of people (user A and user B) surround a table top 6 and have discussions while viewing information (still image, moving image, text, and the like) presented on the table top 6. Specifically, an image is projected onto the table top 6 by a projector (hereinafter, referred to as "information processing apparatus 1") provided in a ceiling hanging unit 5. The user A and the user B can have discussions while looking at the image projected onto the table top 6.

Information projected by the information processing apparatus 1 may be stored in a storage unit 13 inside the information processing apparatus 1 (see FIG. 3; so-called local storage) or may be acquired via a network 7 from a content DB 8 (so-called web storage or server) in the network. Alternatively, the information processing apparatus 1 may be connected to an external device (mobile terminal or the like) via wireless or wired communication such as Wi-Fi (registered trademark), Bluetooth (registered trademark), or proximity wireless communication and may acquire the information from the external device.

An image pickup device 2a is provided inside the ceiling hanging unit 5. The image pickup device 2a continuously captures an image of the table top 6 and captures an image of user operation performed on an image projected onto the table top 6. The image pickup device 2a also captures an image of the users surrounding the table top 6. An image captured by the image pickup device 2a is transmitted to the information processing apparatus 1.

Speakers 3a and microphones 4a are provided in the ceiling hanging unit 5. Each speaker 3a outputs sound accompanied by a projected image. For example, a video of a moving image is projected by the information processing apparatus 1 and sound of the moving image is output from the speaker 3a. Sound data to be output is transmitted from the information processing apparatus 1. Each microphone 4a picks up sound of the users surrounding the table top 6 and transmits the sound to the information processing apparatus 1.

As shown in FIG. 1, image pickup devices 2b, speakers 3b, and microphones 4b are provided in the table top 6. The image pickup devices 2b capture images of the users surrounding the table top 6 and transmit the captured images to the information processing apparatus 1. Operation of the speakers 3b and the microphones 4b is similar to that of the speakers 3a and the microphones 4a.

Figure 2:
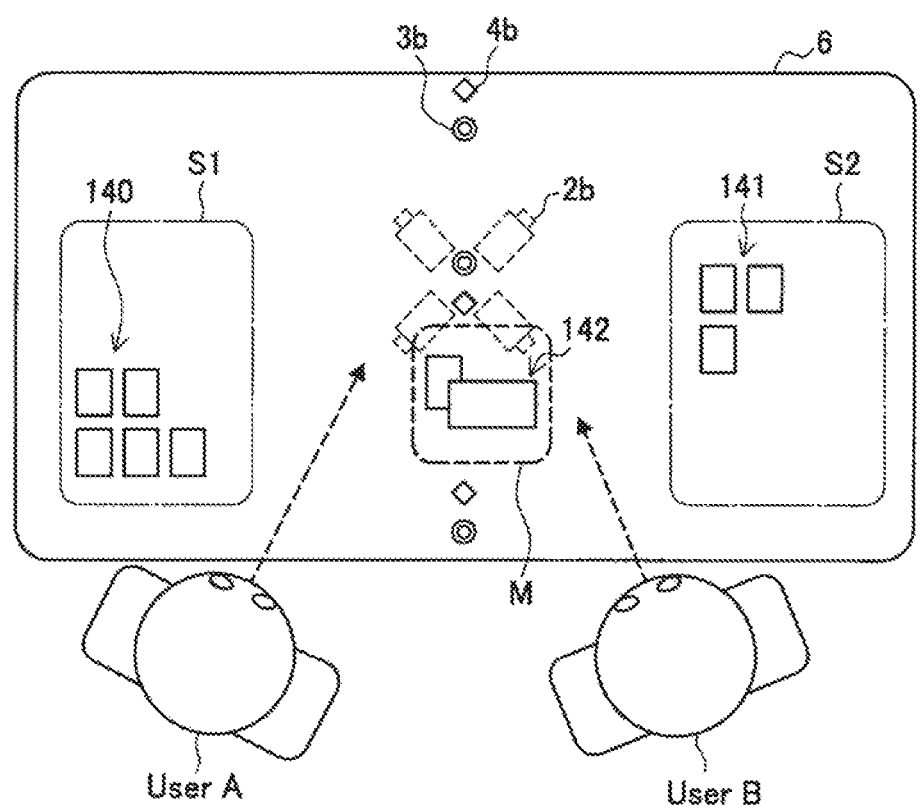
FIG. 2 is a top view of a table top shown in FIG. 1.

Note that the image pickup devices 2b, the speakers 3b, and the microphones 4b provided in the table top 6 are arranged so that the plurality of image pickup devices 2b are differently directed as shown in the top view of FIG. 2 and pairs of the speakers 3b and the microphones 4b are dispersively provided.

BACKGROUND

Herein, there has been conventionally proposed a technique for displaying an object serving as a document of a meeting or the like on a display of an electronic board or a table-top type display device so that the object can be viewed by a plurality of people. In such a conventional technique, convenience of joint viewing among a plurality of people has been regarded as important, but hiding security information from other viewers has not been considered.

In view of this, in this embodiment, an area that can be visually recognized only by a specified user (referred to as "confidential area") and area that can be visually recognized by all users (referred to as "shared area") are differentiated on an information presentation surface simultaneously viewed by a plurality of people and information presentation control to each area is performed, and therefore it is possible to ensure security while regarding convenience of joint viewing among a plurality of people as important.

Specifically, as shown in, for example, FIG. 2, a shared area M in which fields of view of both the user A and the user B are overlapped, a confidential area S1 that can be visually recognized only by the user A, and a confidential area S2 that can be visually recognized only by the user B are determined in accordance with lines of sight of the user A and the user B surrounding the table top 6. Line-of-sight directions of the users A and B are estimated on the basis of, for example, a captured image obtained by the image pickup device 2b and sound data obtained by the microphone 4b.

In accordance with a determination result of areas, the information processing apparatus 1 performs projection control so that information (content) 140 to be seen only by the user A is presented in the confidential area S1, performs projection control so that information 141 to be seen only by the user B is presented in the confidential area S2, and performs projection control so that information 142 to be seen by all users is presented in the shared area M.

Hereinabove, the outline of the control system according to an embodiment of the present disclosure has been described. Note that the numbers and arrangement positions of the image pickup devices 2a and 2b, the speakers 3a and 3b, and the microphones 4a and 4b are not limited to the examples shown in FIG. 1 and FIG. 2. The speakers 3 and the microphones 4 may not be provided. Next, a basic configuration of the information processing apparatus 1 included in the control system of this embodiment will be described.

2. Basic Configuration

Figure 3:
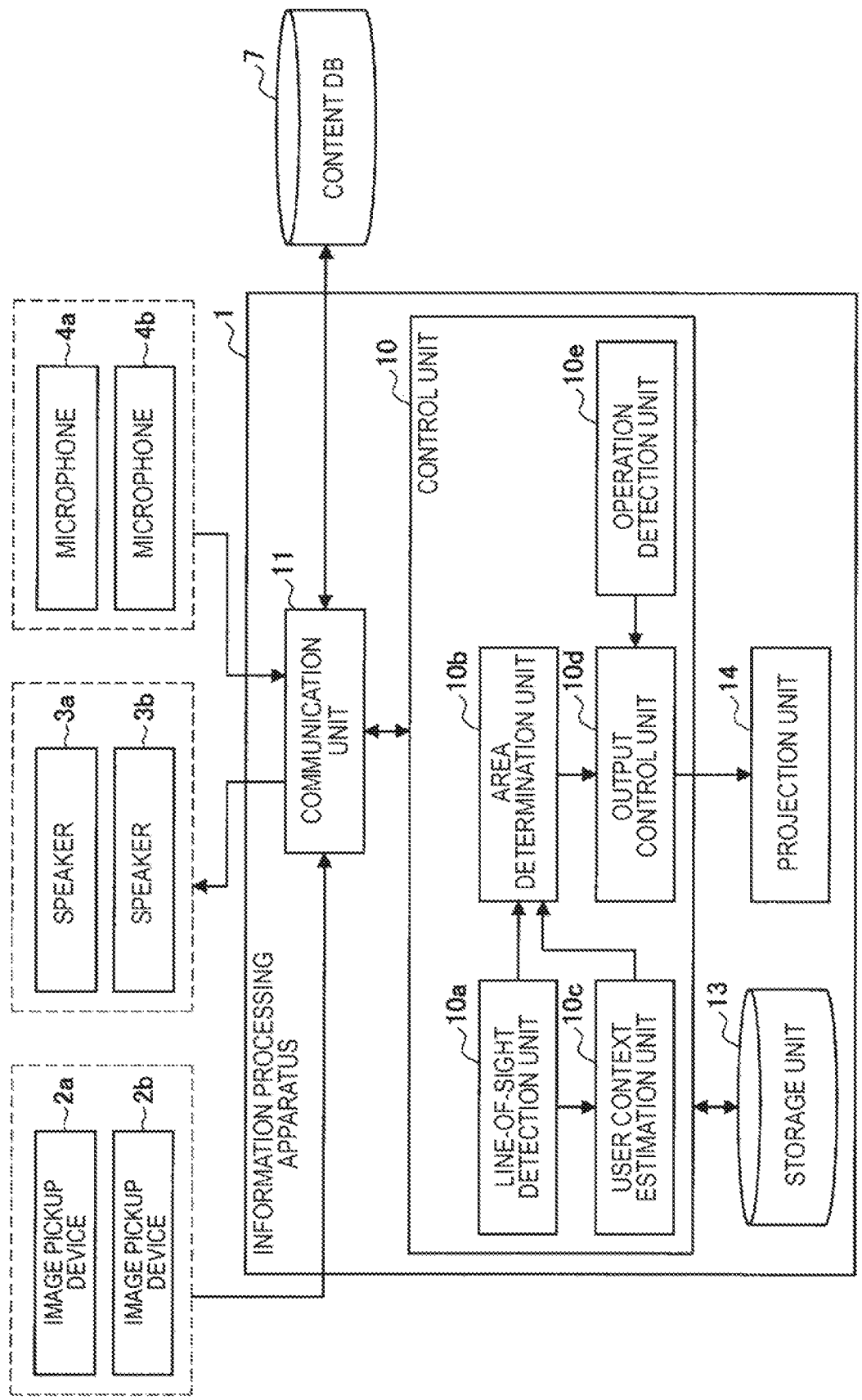
FIG. 3 is a block diagram showing an example of a configuration of an information processing apparatus 1 according to this embodiment.

FIG. 3 is a block diagram showing an example of a configuration of the information processing apparatus 1 according to this embodiment. As shown in FIG. 3, the information processing apparatus 1 includes a control unit 10, a communication unit 11, the storage unit 13, and a projection unit 14.

(Control Unit 10)

The control unit 10 is made up of, for example, a microcomputer including a central processing unit (CPU), a read only memory (ROM), a random access memory (RAM), a nonvolatile memory, and an interface unit and controls each configuration of the information processing apparatus 1. Specifically, as shown in FIG. 3, the control unit 10 according to this embodiment functions as a line-of-sight detection unit 10a, an area determination unit 10b, a user context estimation unit 10c, an output control unit 10d, and an operation detection unit 10e.

—Line-of-Sight Detection Unit 10a

The line-of-sight detection unit 10a detects a line-of-sight direction of each user surrounding the table top 6 and outputs a detection result to the area determination unit 10b. Specifically, the line-of-sight detection unit 10a detects the line-of-sight direction of each user on the basis of a captured image transmitted from the image pickup device 2a or 2b. The line-of-sight direction of the user can be detected on the basis of movement of eyes (pupils), a direction of a head, or a posture (direction of body). The line-of-sight detection unit 10a can also detect the line-of-sight direction of the user by analyzing a sound source direction on the basis of sound data (sound of user) transmitted from the microphone 4a or 4b and estimating a head direction or posture (direction of body) of the user. In addition, the line-of-sight detection unit 10a may output the detection result to the user context estimation unit 10c.

—Area Determination Unit 10b

The area determination unit 10b determines, on the table top 6 (presentation surface), a shared area that can be visually recognized by a plurality of users and a confidential area that is not visually recognized by other users to keep information of each user confidential on the basis of line-of-sight directions of the plurality of users detected by the line-of-sight detection unit 10a. Specifically, the area determination unit 10b determines a region in which readable areas (field-of-view ranges) of the users based on the line-of-sight directions are overlapped as a shared area and determines a region in which the readable areas of the users are not overlapped as a confidential area of each user. The confidential area may further be determined as a region that is within a certain distance from a target user and is separated at a certain distance from the shared area. Area determination processing performed by the area determination unit 10b will be described later with reference to FIGS. 4 to 8.

In the case where a user context is output from the user context estimation unit 10c described later, the area determination unit 10b may adjust a size of the readable area in consideration of the user context.

—User Context Estimation Unit 10c

The user context estimation unit 10c estimates what a user is looking at (i.e., user context) on the basis of movement of a line of sight detected by the line-of-sight detection unit 10a. For example, the user context estimation unit 10c estimates whether the user is reading a sentence or viewing a moving image on the basis of movement of the line of sight of the user. Normally, a field of view of a human is reduced when he/she recognizes letters, e.g., while he/she is reading a sentence. Therefore, when the user context estimation unit 10c estimates what the user is looking at and outputs an estimation result (user context) to the area determination unit 10b, the area determination unit 10b can adjust the readable area (for example, can reduce the readable area in the case where the user is reading a sentence).

—Output Control Unit 10d

The output control unit 10d performs output control of presentation information in accordance with a determination result by the area determination unit 10b. Specifically, the output control unit 10d controls the projection unit 14 so that information (content) to be seen by each user is projected onto a confidential area of the corresponding user on the table top 6 and controls the projection unit 14 so that information to be seen by all users is projected onto the shared area.

The output control unit 10d may perform output control of sound from the speakers 3a and 3b in accordance with a determination result by the area determination unit 10b. That is, the output control unit 10d performs control so that information to be heard (for example, video sound) only by each user is output as sound from the speakers 3a and 3b while having directionality with respect to a position of the corresponding user and controls the speakers 3a and 3b so that information to be heard by all users is output as sound without having directionality (nondirectionality).

—Operation Detection Unit 10e

The operation detection unit 10e detects user operation (tapping operation, dragging operation, or the like) with respect to information presented on the table top 6. The operation detection unit 10e may detect user operation on the basis of a captured image continuously captured by the image pickup device 2 or may detect user operation on the basis of a detection result by a contact/proximity detection device (not shown) such as a touchscreen provided on the whole top surface of the table top 6. Alternatively, the operation detection unit 10e may detect user operation based on sound input on the basis of sound of a user picked up by the microphone 4.

(Communication Unit 11)

The communication unit 11 is connected to an external device via wireless/wired communication and has a function of transmitting and receiving data. The communication unit 11 according to this embodiment is connected to, for example, the image pickup device 2, the speaker 3, the microphone 4, or the external content DB 7 in the network to receive a captured image, sound data, or content and transmit a control signal to issue an instruction to output sound.

(Storage Unit 13)

A program for executing each processing of the control unit 10 is stored in the storage unit 13. Further, various pieces of content such as a photograph, a video, and a document may also be stored in the storage unit 13.

(Projection Unit 14)

The projection unit 14 includes a light source, a movable mirror, an illumination optical system, a projection optical system, and the like. The projection unit 14 is a display device for projecting a video and causes light emitted from a high-luminance light source to be transmitted through, for example, a liquid crystal panel to thereby project the light onto the table top 6 (presentation surface) or the like. Specifically, light emitted from the light source is output to the illumination optical system and is transmitted through the liquid crystal panel in the illumination optical system, and thus video light is generated. The generated video light is output to the projection optical system, and the video light is projected through a projection lens or the like included in the projection optical system onto the table top 6 (presentation surface) or the like. The projection optical system has an optical axis whose direction is substantially vertical to a projection direction of the light source.

Hereinabove, the configuration of the information processing apparatus 1 according to this embodiment has been specifically described. Note that, in this embodiment, information to be presented on the table top 6 is projected from the projection unit 14 of the information processing apparatus 1, but the present disclosure is not limited thereto. For example, in the case where a display device is provided in the table top 6, the output control unit 10d of the information processing apparatus 1 instructs, via the communication unit 11, the display device to perform presentation control of content in accordance with a determination result by the area determination unit 10b. The display device is made up of, for example, a liquid crystal display (LCD), an organic light-emitting diode (OLED), or the like and is extended in a horizontal direction on the table top 6.

The configuration of the information processing apparatus 1 shown in FIG. 3 is merely an example, and the present disclosure is not limited thereto. For example, the projection unit 14 may be an external device or may include an image pickup device, a speaker, and a microphone.

3. Operation Processing

The area determination processing of the control system according to this embodiment will be described with reference to FIGS. 4 to 8.

<3-1. Readable Area Determination Processing>

Figure 4:
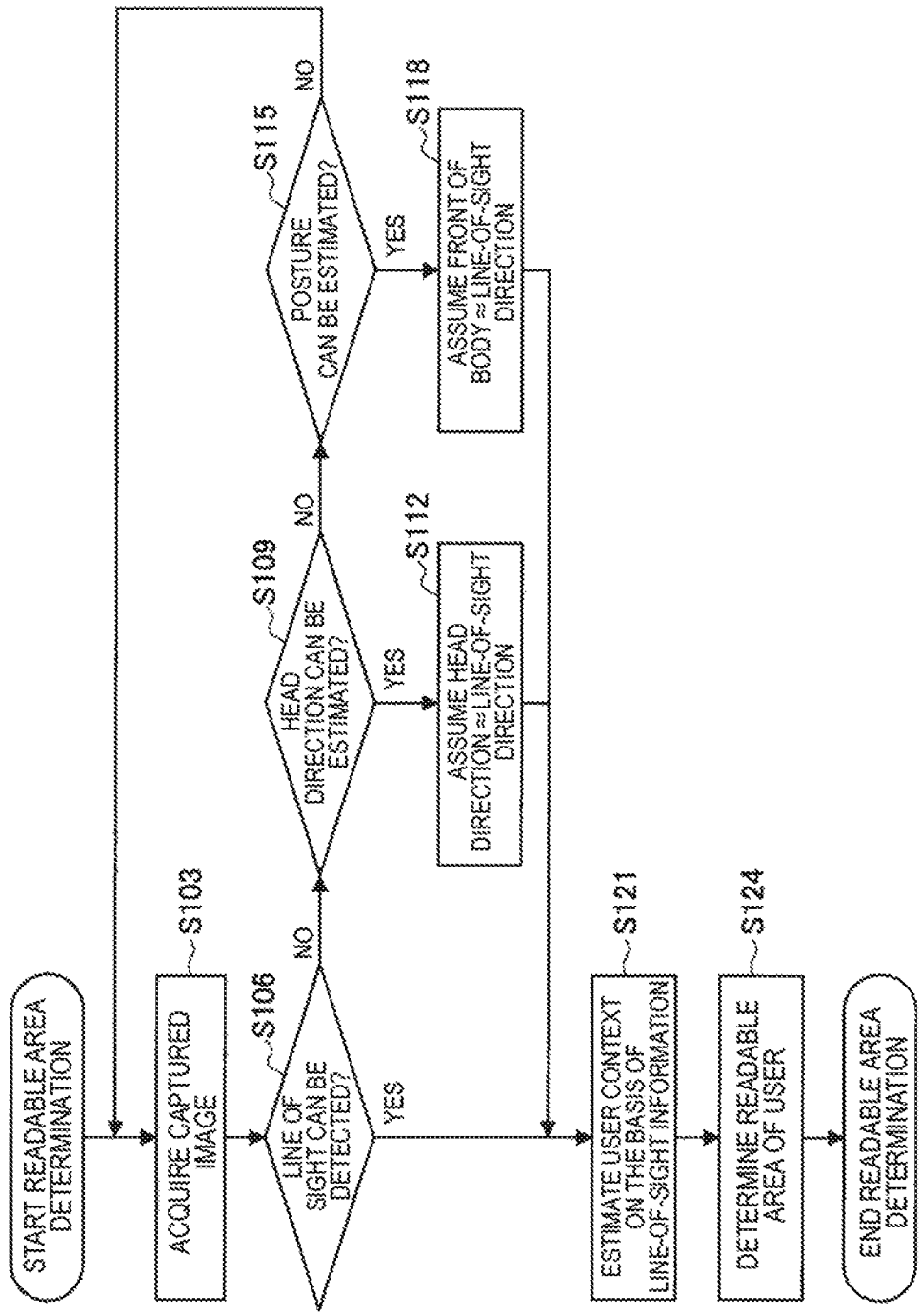
FIG. 4 is a flowchart showing readable area determination processing according to this embodiment.

Readable area determination processing according to this embodiment will be described with reference to FIG. 4. As shown in FIG. 4, in Step S103, the information processing apparatus 1 acquires a captured image from the image pickup device 2. Acquisition of a captured image is continuously performed, and, in the case where a plurality of the image pickup devices 2a and 2b are provided, a captured image is continuously acquired from each of the image pickup devices 2a and 2b.

Next, in Step S106, the line-of-sight detection unit 10a of the information processing apparatus 1 detects a line of sight of each user on the basis of the captured image. Specifically, the line-of-sight detection unit 10a analyzes eyes of the user appearing in the captured image and detects a line-of-sight direction in accordance with positions and movement of pupils or irises. The line-of-sight detection unit 10a can also detect the line-of-sight direction by detecting reflected light on corneas, the reflected light being obtained by irradiating the corneas with an IR LED.

Then, in the case where the line of sight cannot be detected (S106/No), the line-of-sight detection unit 10a estimates a head direction of each user on the basis of the captured image in Step S109. For example, in the case where an image of the eyes of the user is not captured or in the case where an image of the eyes is captured but the line of sight is not detectable on the basis of the image, it is determined that the line of sight cannot be detected. Further, in the case where the image pickup device 2 captures an image of surroundings in a wide range with a wide angle lens, the line-of-sight detection unit 10a enlarges the captured image to analyze the captured image. Thus, in the case where resolution thereof is low, it is difficult to detect the line of sight. Therefore, in such a case, the line-of-sight detection unit 10a estimates the head direction of the user on the basis of the captured image.

Next, in Step S112, the line-of-sight detection unit 10a assumes the head direction as the line-of-sight direction. With this, even in the case where an accurate line-of-sight direction of the user cannot be detected on the basis of the captured image, it is possible to perform readable area determination described later by assuming the head direction as the line-of-sight direction.

On the contrary, in the case where the head direction cannot be estimated (S109/No), the line-of-sight detection unit 10a estimates a posture of each user on the basis of the captured image in Step S115. Specifically, the line-of-sight detection unit 10a estimates a direction of a body of each user.

Next, in Step S118, the line-of-sight detection unit 10a assumes a front direction of the body as the line-of-sight direction. With this, even in the case where an accurate line-of-sight direction of the user cannot be detected on the basis of the captured image or the head direction cannot be estimated, it is possible to perform the readable area determination described later by assuming the front direction of the body as the line-of-sight direction.

Then, in Step S121, the user context estimation unit 10c estimates a user context on the basis of the detection result of the line of sight by the line-of-sight detection unit 10a. For example, the user context estimation unit 10c estimates whether the user is reading a sentence or viewing a moving image as the user context in accordance with movement of the line-of-sight direction.

Then, in Step S124, the area determination unit 10b determines a readable area of each user in accordance with the detection result by the line-of-sight detection unit 10a. Further, the area determination unit 10b refers to the user context estimated by the user context estimation unit 10c as necessary.

Figure 5:
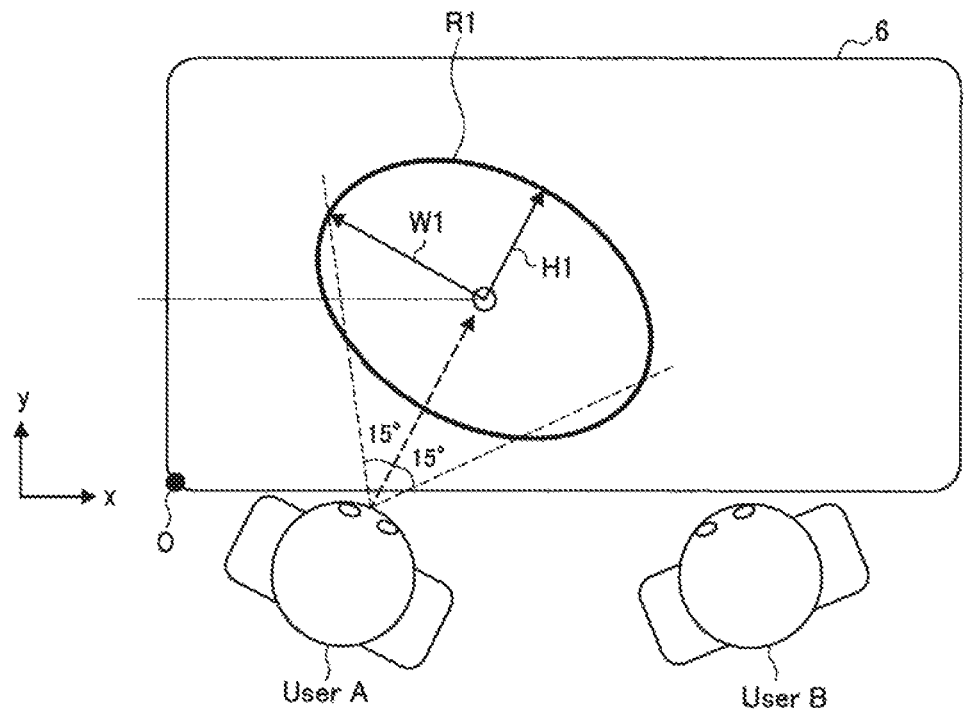
FIG. 5 is a diagram showing determination of a horizontal direction (long diameter) of a readable area.
Figure 6:
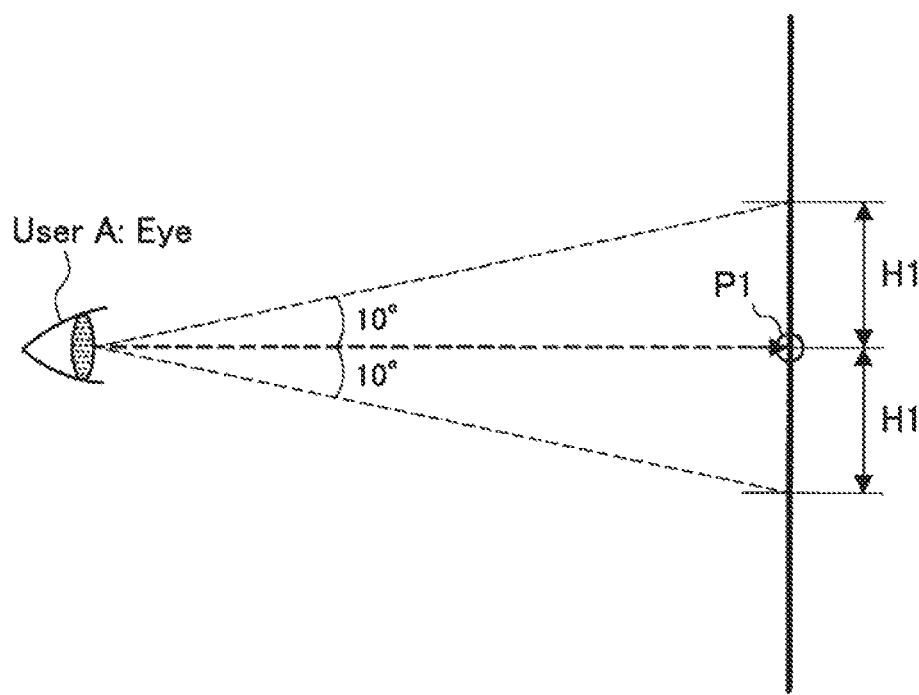
FIG. 6 is a diagram showing determination of a vertical direction (short diameter) of a readable area.

Herein, a specific example of the readable area determination performed by the area determination unit 10b will be described with reference to FIG. 5 and FIG. 6. In the example shown in FIG. 5, a readable area R1 of the user A is determined. In the case where the whole range of the table top 6 is a presentation surface, an intersection of a line-of-sight direction of the user A and the presentation surface is set to be a fixation point P1 and the periphery of the fixation point P1 is determined as the readable area R1. The readable area R1 is an effective field of view in the field of view of the user A, the effective field of view being a field of view in which the user can exert at least an excellent information receiving ability to recognize matters, and may be set to be, for example, a range of 15 degrees in a horizontal direction from the fixation point P1 as shown in FIG. 5 or a range of 10 degrees in a vertical direction from the fixation point P1 as shown in FIG. 6. A region of the readable area determined as described above is indicated, for example, as follows.

user_id:12345, readable_area:[x, y (fixation point P), H (short diameter), W (long diameter)]

Herein, the fixation point P is set by using an origin O shown in FIG. 5 as a base point, the short diameter H indicates a length in a vertical (longitudinal) direction in the field of view of the user by using the fixation point P as a base point, and the long diameter W indicates a length in a horizontal (lateral) direction in the field of view of the user by using the fixation point P as a base point.

The readable area determination processing described above is similarly performed for the user B, and the readable areas of the user A and the user B are output. Note that, in the examples shown in FIG. 5 and FIG. 6, the readable area R has a unique size, such as a size having 15 degrees in the horizontal direction and 10 degrees in the vertical direction. However, the present disclosure is not limited thereto, and a plurality of levels may be set as the size of the readable area. Further, the area determination unit 10b may adjust the size of the readable area in accordance with the above user context. Specifically, the area determination unit 10b calculates the readable area by using an area enlargement coefficient (Z) that has been set in advance in accordance with the user context. The area enlargement coefficient (Z) is set to be smaller as a task needs to be more attentive. For example, the area enlargement coefficient is set to "Z=0.5" during reading and is set to "Z=0.8" during viewing a moving image.

An example of determination data of the readable area considering such setting on a plurality of levels and the user context is as follows.
user_id:12345,
100%_readable_area:[75,50,20'2,40*Z],
50%_readable_area:[75,50,40*Z,80*Z],
context:gazing_image Hereinabove, the readable area determination processing according to this embodiment has been specifically described. Next, the area determination unit 10b determines a shared area and a confidential area on the basis of the determined readable area of each user. Hereinafter, specific description will be provided with reference to FIGS. 7 to 8.

<3-2. Shared/Confidential Area Determination Processing>

Figure 7:
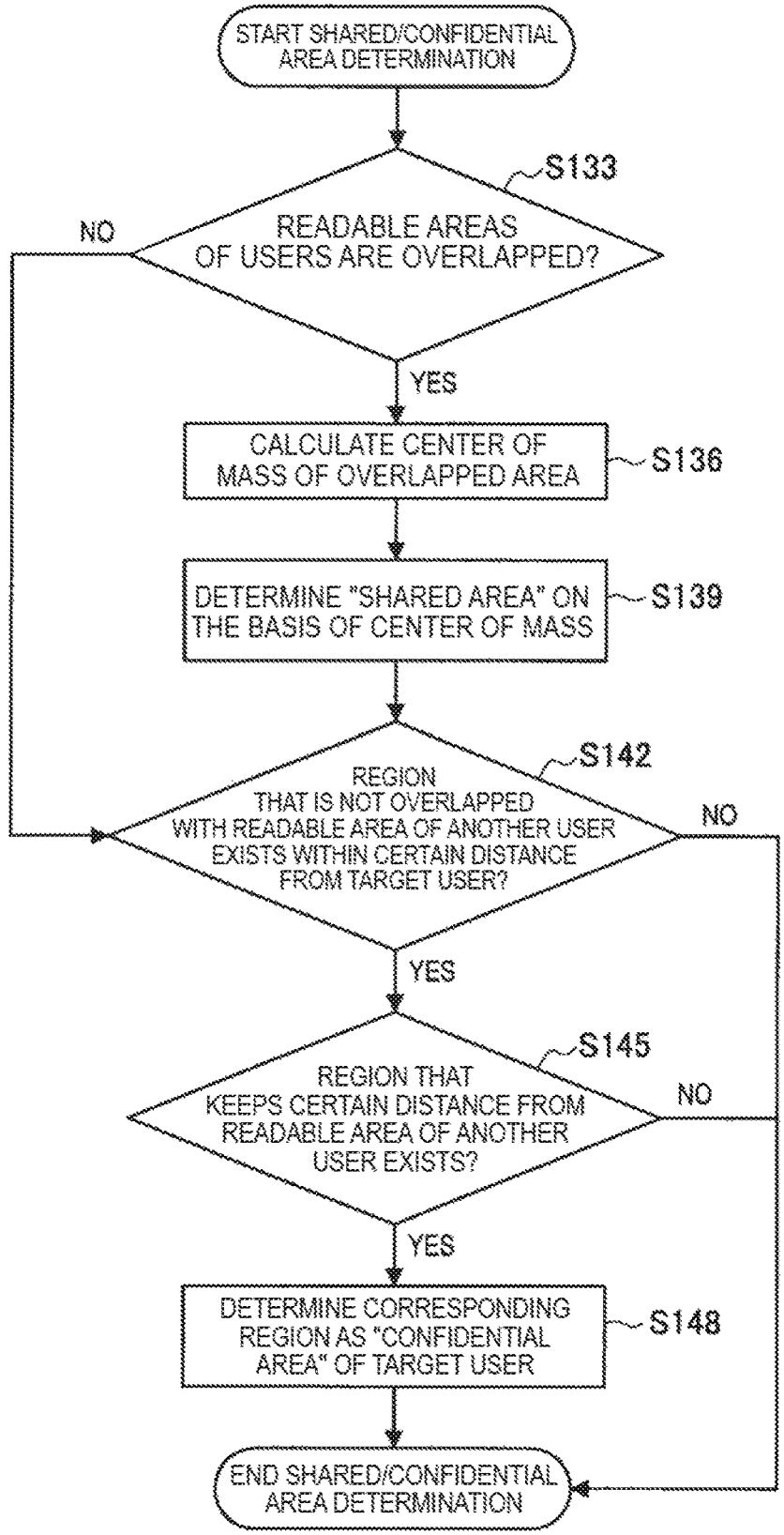
FIG. 7 is a flowchart showing shared/confidential area determination processing according to this embodiment.

FIG. 7 is a flowchart showing shared/confidential area determination processing according to this embodiment. As shown in FIG. 7, in Step S133, the area determination unit 10b of the information processing apparatus 1 determines whether or not readable areas of a plurality of users are overlapped. For example, the readable area R1 of the user A and a readable area R2 of the user B are overlapped in the vicinity of the center of the table top 6 in the example shown in FIG. 8.

Next, in the case where it is determined that the areas are overlapped (S133/Yes), the area determination unit 10b calculates the center C of mass of an overlapped part in Step S136.

Figure 8:
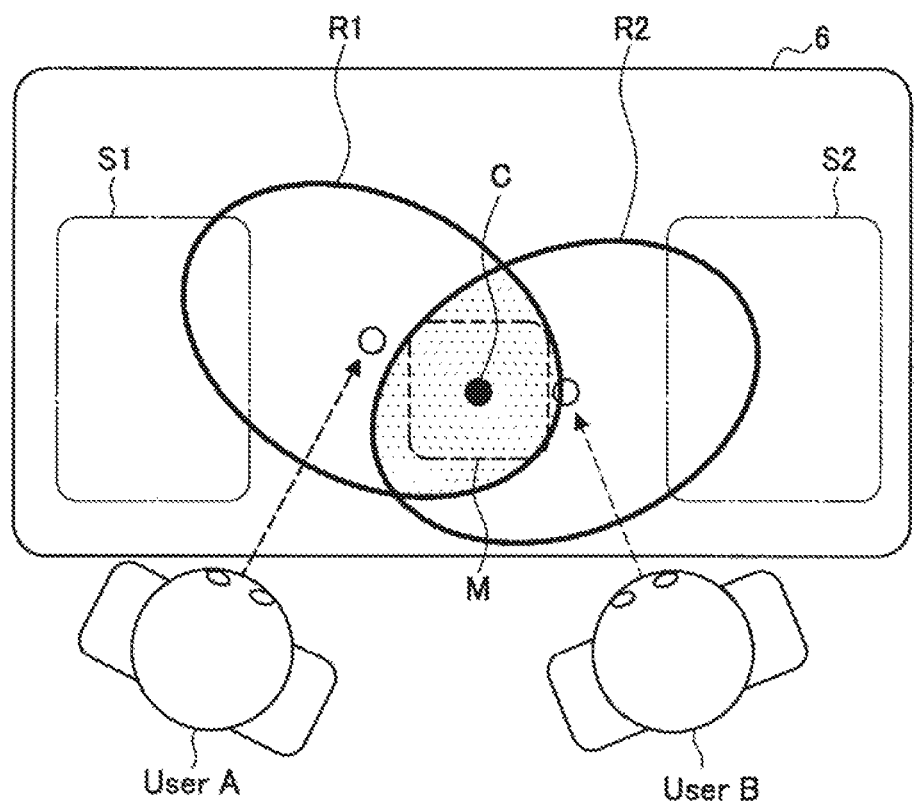
FIG. 8 is a diagram showing shared/confidential area determination.

Then, in Step S139, the area determination unit 10b determines the shared area M on the basis of the center C of mass. The shared area M may have a maximum size in a region in which the readable area R1 of the user A and the readable area R2 of the user B are overlapped overlapped as shown in FIG. 8 or may have a predetermined minimum size or more on the basis of the center C of mass.

On the contrary, in the case where the areas are not overlapped (S133/No), shared area determination is not performed, and confidential area determination processing (S142 described next) is performed.

Then, in Step S142, the area determination unit 10b determines whether or not a region that is not overlapped with a readable area of another user exists within a certain distance from a target user. For example, in the case where the confidential area of the user A is determined, the area determination unit 10b determines whether or not a region that is not overlapped with the readable area R2 of the user B within a range obtained by drawing a circular arc with an average length of an arm around a position of the user A.

Next, in the case where a region that is not overlapped with the readable area R of another user exists (S142/Yes), the area determination unit 10b determines whether or not a region that keeps (is separated by) a certain distance from the readable area R of the another user exists in Step S145.

In the case where there is no region that is not overlapped with the readable area of the another user within the certain distance from the target user (S142/No) or in the case where there is no region that keeps the certain distance from the readable area R of the another user (S145/No), the confidential area determination is not performed, and the determination processing is terminated.

Then, in the case where there is a region that keeps the certain distance from the readable area R of the another user (S145/Yes), the region is determined as the confidential area S of the target user in Step S148. For example, as shown in FIG. 8, a region that is within a certain distance from the user A, is not overlapped with the readable area R2 of the user B, and keeps a certain distance from the readable area R2 is determined as the confidential area S1. Such confidential area determination is performed for all users, and the confidential areas S1 and S2 of the respective users are determined.

4. Presentation Control Example

Hereinabove, the configuration of the control system and the area determination processing according to this embodiment have been specifically described. Next, presentation control and the like performed by the information processing apparatus 1 on the basis of an area determination result will be described with reference to FIGS. 9 to 12.

<4-1. Presentation Control of Confidential Information>

In this embodiment, the output control unit 10d of the information processing apparatus 1 performs control so that information that needs to be secured (confidential information) is presented in the confidential area S. What kind of information is presented in the confidential area S is determined in accordance with predetermined definition information. This definition information may be set by a user, may be automatically set on the basis of a user's operation history, or may be updated by, for example, an update of software.

Figure 9:
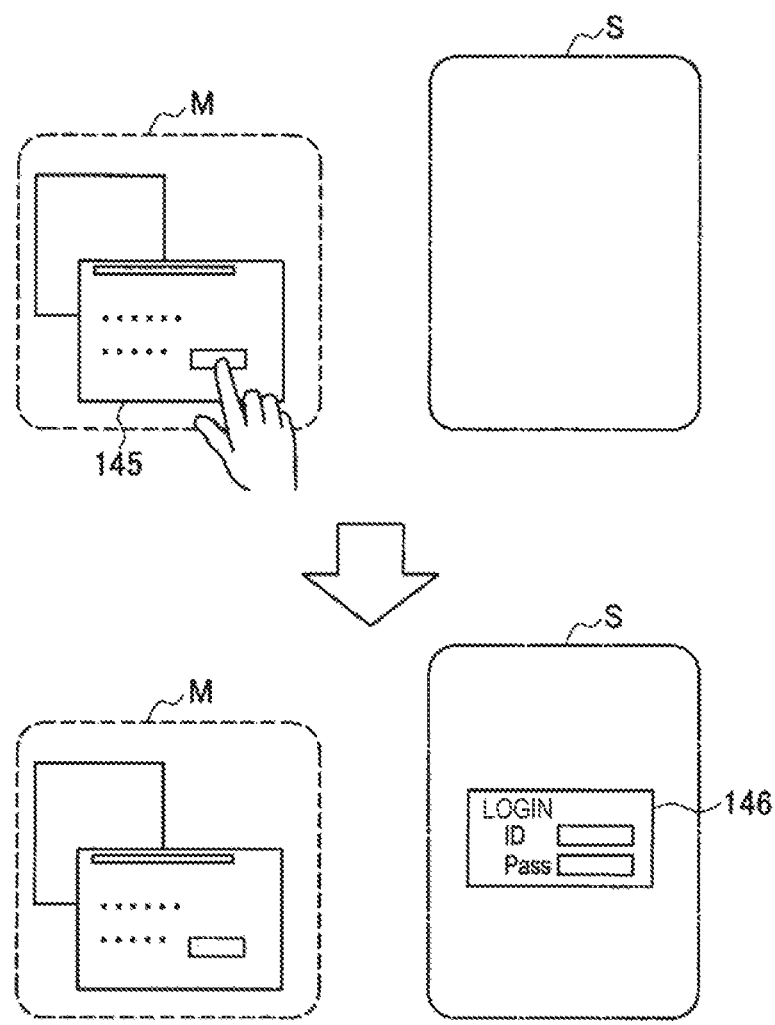
FIG. 9 is a diagram showing control of presentation to a confidential area performed in the case where content that needs to be secured is opened.

For example, as shown in FIG. 9, in the case where content 145 is operated in the shared area M and content that needs to be secured (for example, input screen of PIN code, input history display screen, or viewing history display screen) is opened, the output control unit 10d performs control so that such content 146 that needs to be secured is presented in the confidential area S. With this, it is possible to prevent unintentional information leakage in the case where a plurality of people perform simultaneous operation/viewing.

Further, in the case where an image gallery, an email screen (transmission/reception box), or the like is opened, the output control unit 10d may perform control so that the image gallery, the email screen, or the like is displayed in the confidential area S. Because the user moves only a necessary content to the shared area M and shares the content, it is possible to prevent unnecessary information leakage.

In the case where the above content that needs to be secured is content accompanying sound such as a moving image and a directional speaker is connected, the output control unit 10d performs sound output control so that the sound is transmitted only to an owner user of the content.

Note that, in the case where there is no highly confidential area, the output control unit 10d may also perform control so that, before the content that needs to be secured is presented, for example, a dialog or the like is presented to the user and the user gives approval, and thereafter the content is presented in the shared area M.

Further, the output control unit 10d may also perform control so that the content is presented with a low resolution in the confidential area S. With this, even in the case where the content is looked at by another user, it is possible to prevent information leakage as much as possible.

<4-2. Movement of Content Between Areas>

Then, presentation control performed in the case where a user moves content from the shared area M to the user's confidential area S or in the case where the user moves content from the user's confidential area S to the shared area M will be described with reference to FIG. 10 and FIG. 11.

(Movement of Content from Shared Area M)

Figure 10:
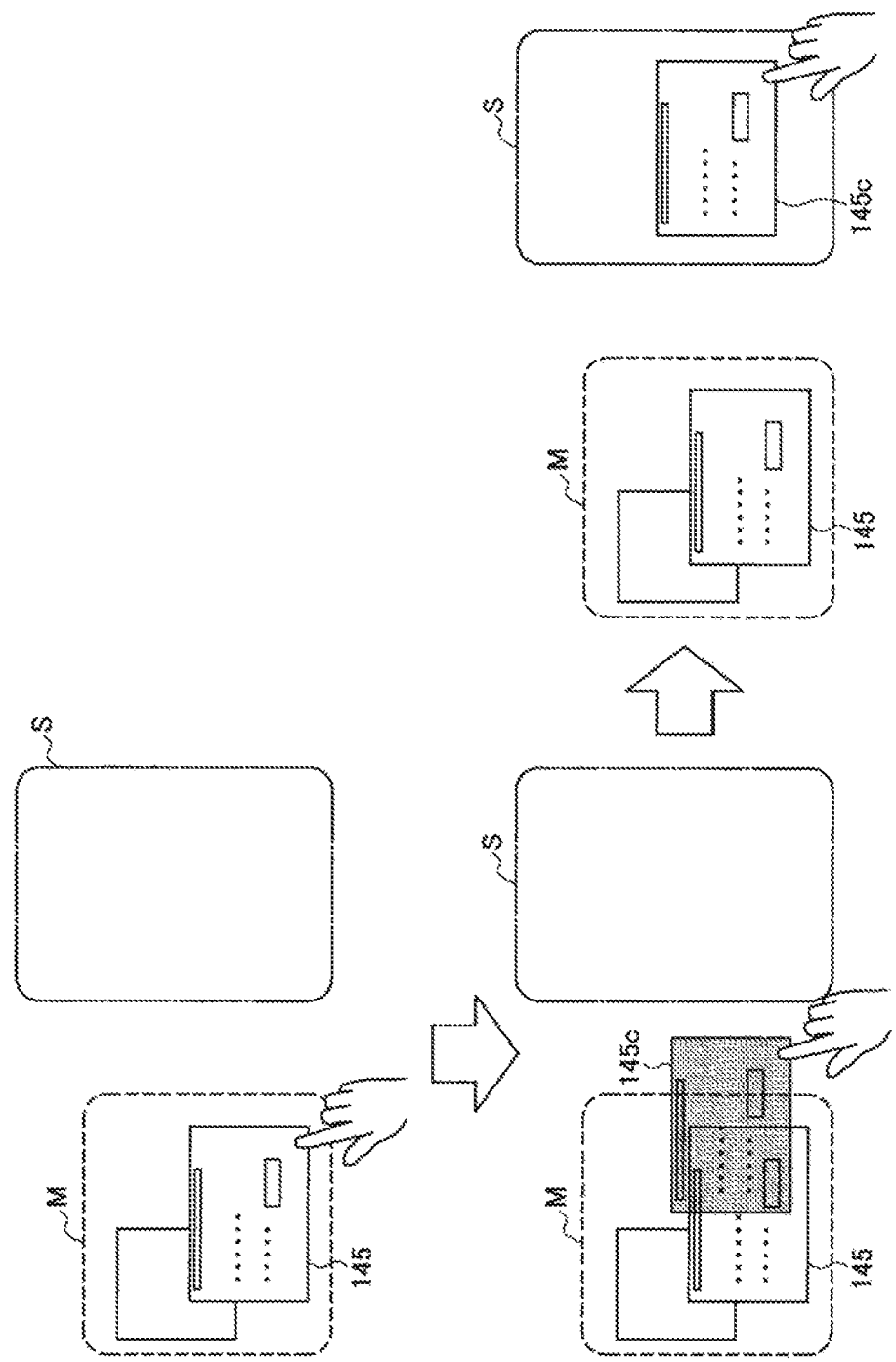
FIG. 10 is a diagram showing automatic copy performed when content is moved from a shared area to a confidential area.

FIG. 10 is a diagram showing automatic copy performed when content is moved from the shared area M to the confidential area S. As shown in FIG. 10, when the content 145 presented in the shared area M is selected and dragging thereof to the confidential area S is detected, the output control unit 10d presents content 145c obtained by copying the selected content 145 and moves the content 145c in accordance with dragging operation performed by the user. Then, when the content 145c is dropped in the confidential area S, the output control unit 10d performs control so that the content 145c is presented in the confidential area S.

With this, a single user's content operation does not interrupt another user viewing content. Note that the content 145 is automatically copied when the user selects the content 145 in the example shown in FIG. 10, but the present disclosure is not limited thereto. For example, the content 145 may be automatically copied when the content 145 reaches an outer edge of the shared area M.

In the case where a directional speaker is connected, the information processing apparatus 1 performs control so that a sound volume is optimized for each user after the content is copied and sound is output to each user, and therefore it is possible not to interrupt each user viewing content.

(Movement of Content from Confidential Area S)

Figure 11:
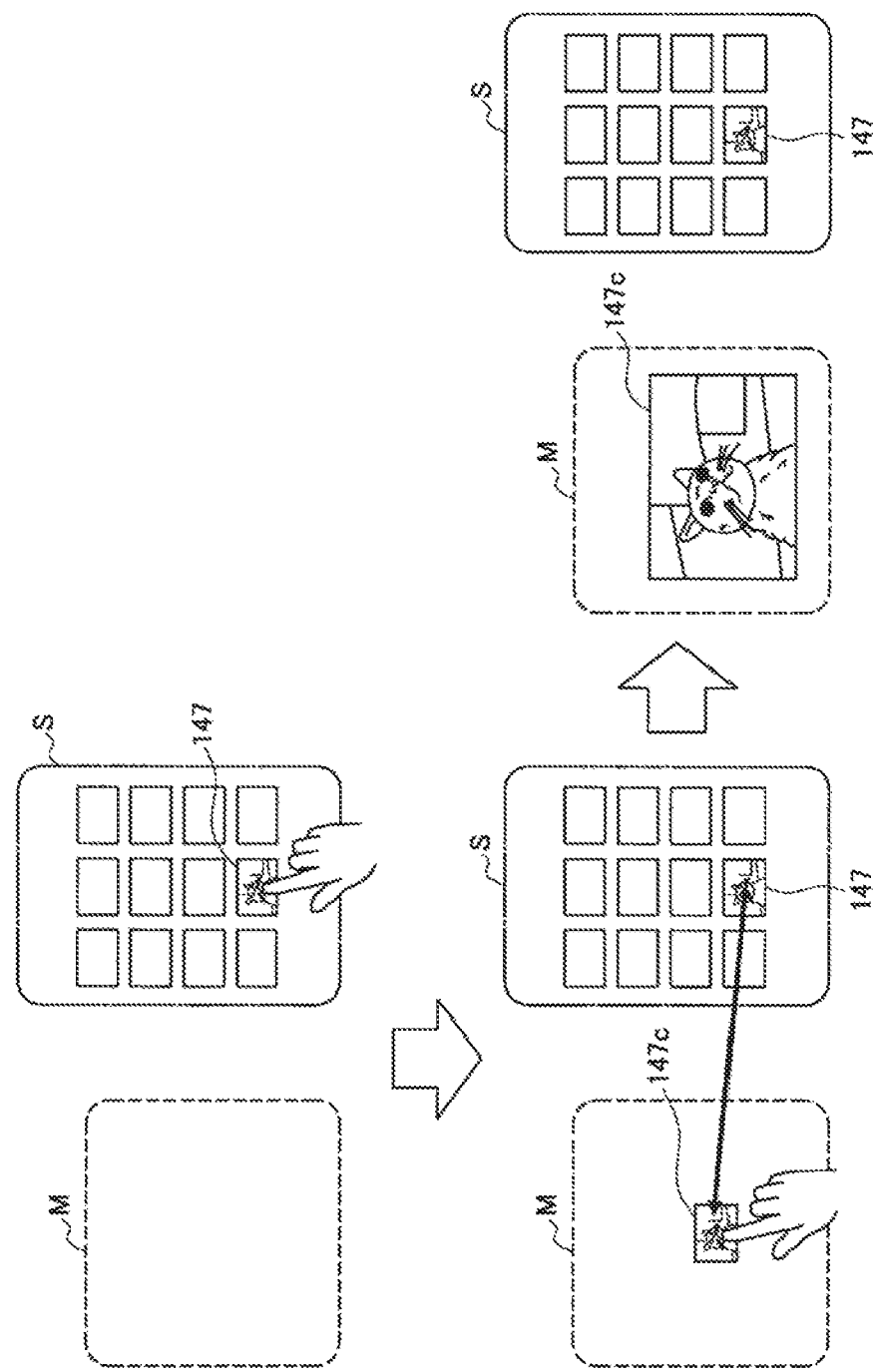
FIG. 11 is a diagram showing optimization control performed when content is moved from a confidential area to a shared area.

FIG. 11 is a diagram showing optimization control performed when content is moved from the confidential area S to the shared area M. As shown in FIG. 11, in the case where an image gallery is displayed in the form of list in the confidential area S, a user selects content 147 to be shared with another user from the list and moves the content to the shared area M. At this time, the output control unit 10d performs control so that the content 147 is copied to generate content 147c and the content is presented with a size and a resolution suitable for viewing by a plurality of people.

As described above, the content is controlled so that, in the case where the content is presented in the shared area M, the content is presented in a state suitable for viewing by a plurality of people, and therefore it is possible to improve usability. Note that optimization of presentation of the content based on viewing by a plurality of people is not limited to the above automatic enlargement or increase in resolution. For example, a presentation position, a presentation direction, a presentation angle, or the like of the content in the shared area M may be optimized for viewing by a plurality of people.

Further, the output control unit 10d may perform control (adjust a speaker direction in the case where there is a directional speaker) so that, based on a detection result of a line of sight of each user, the content is presented at an optimal position for viewing by a plurality of people in the case where a plurality of users view the content and, when a line of sight of another user is removed, the content is presented at an optimal position for remaining viewing users.

In the case of content accompanying sound such as a moving image and when a directional speaker is connected, the output control unit 10d performs control so that the sound is output only to a user who owns the content in the confidential area S and performs control so that, after the content is moved to the shared area M, a directionality direction and a sound volume are optimized so that the content is optimally viewed by all users.

<4-3. Hiding/Deleting of Confidential Information when Content is Moved>

Next, presentation control to automatically hide/delete confidential information contained in content in the case where the content is moved to the shared area M will be described.

For example, in the case where an email box is displayed in the confidential area S, the user selects a necessary email and drags and moves the necessary email from the confidential area S to the shared area M (movement of the content to the shared area M is similar to the case shown in FIG. 11), the output control unit 10d can prevent unintentional information leakage by automatically hiding or deleting confidential information (for example, address information of the email and exif information of an image) contained in the email. Definition of the confidential information to be deleted/hidden may be set as system information in advance, may be set by the user, may be automatically set on the basis of the user's operation history, or may be updated by, for example, an update of software.

Figure 12:
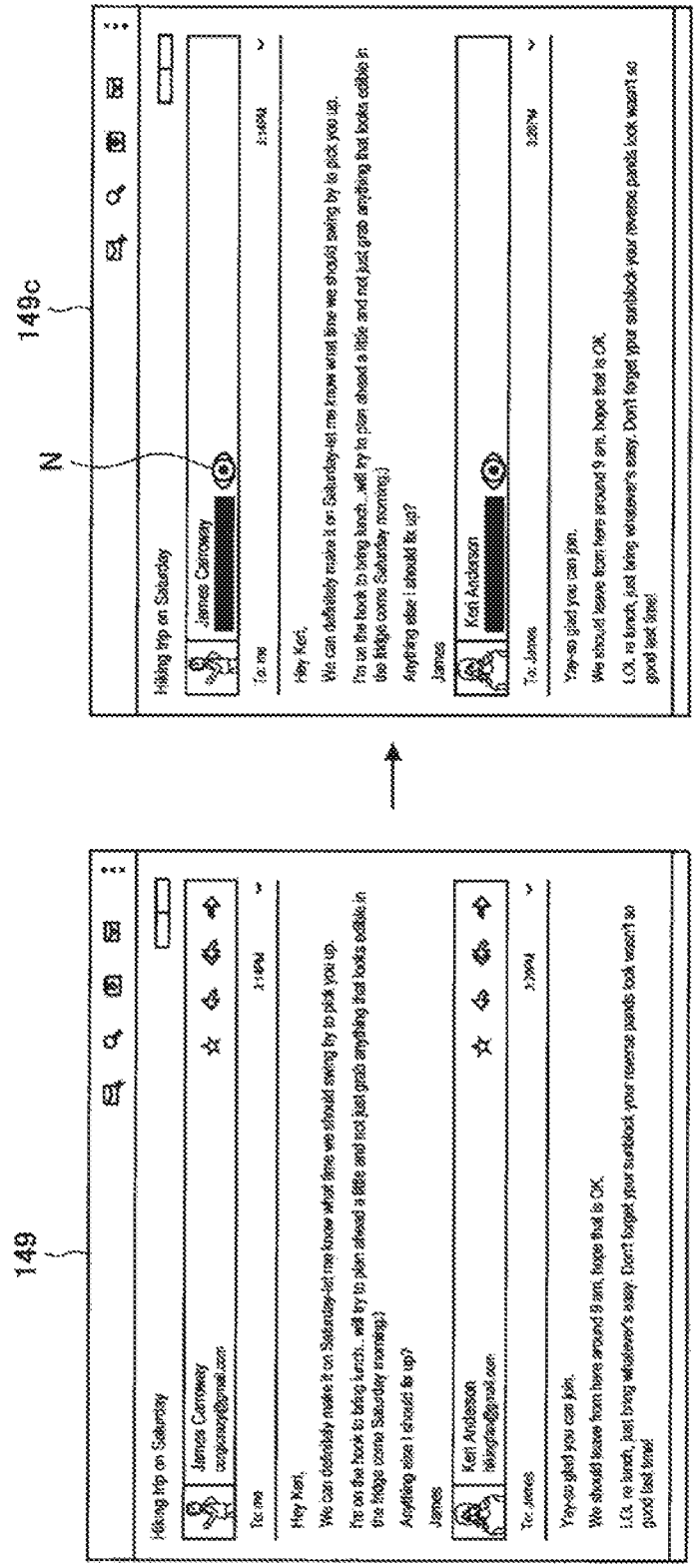
FIG. 12 is a diagram showing a specific example of hiding/deleting of confidential information.

Herein, a specific example of hiding/deleting confidential information will be described with reference to FIG. 12. A left drawing in FIG. 12 shows content 149 presented in the confidential area S (herein, a list screen of sent emails is used as an example). In the case where the content 149 is moved from the confidential area S to the shared area M, the output control unit 10d copies the content 149, changes a size and a resolution of a copied content 149c optimal for viewing by a plurality of people, and then hides/deletes confidential information.

Specifically, as shown in a right drawing in FIG. 12, the output control unit 10d hides address information of emails in the content 149c and displays a display switching button N in the vicinity of a hidden part. The display switching button N is a button for switching hidden display of the address information of the emails, and, when the display switching button is selected, hidden display is removed and the address information of the emails can be seen. Further, operation of the display switching button N may be performed only by a user (owner) who provides the content.

Hereinabove, the presentation control according to this embodiment has been described. Note that a line of sight of a target user is temporarily directed to the confidential area S when, for example, the content is moved, but the readable area, the shared area, and the confidential area may be maintained when a time period in which the line of sight is directed to the confidential area S is within a certain time period. Further, the area determination unit 10b according to this embodiment may update determination of the readable area, the shared area, and the confidential area for each predetermined time period.

5. Modification Example

Hereinabove, the control system according to this embodiment has been specifically described. In this embodiment, the table top 6 is used as an example of a presentation surface of information, and there is also assumed a case where an object (PC, book, or the like) is placed on the table top 6. In this case, a field of view of a user is influenced in some cases depending on a position or size of the object. In view of this, considering an object placed on the table top 6 at the time of area determination will be described in a modification example of this embodiment.

<5-1. Outline>

Figure 13:
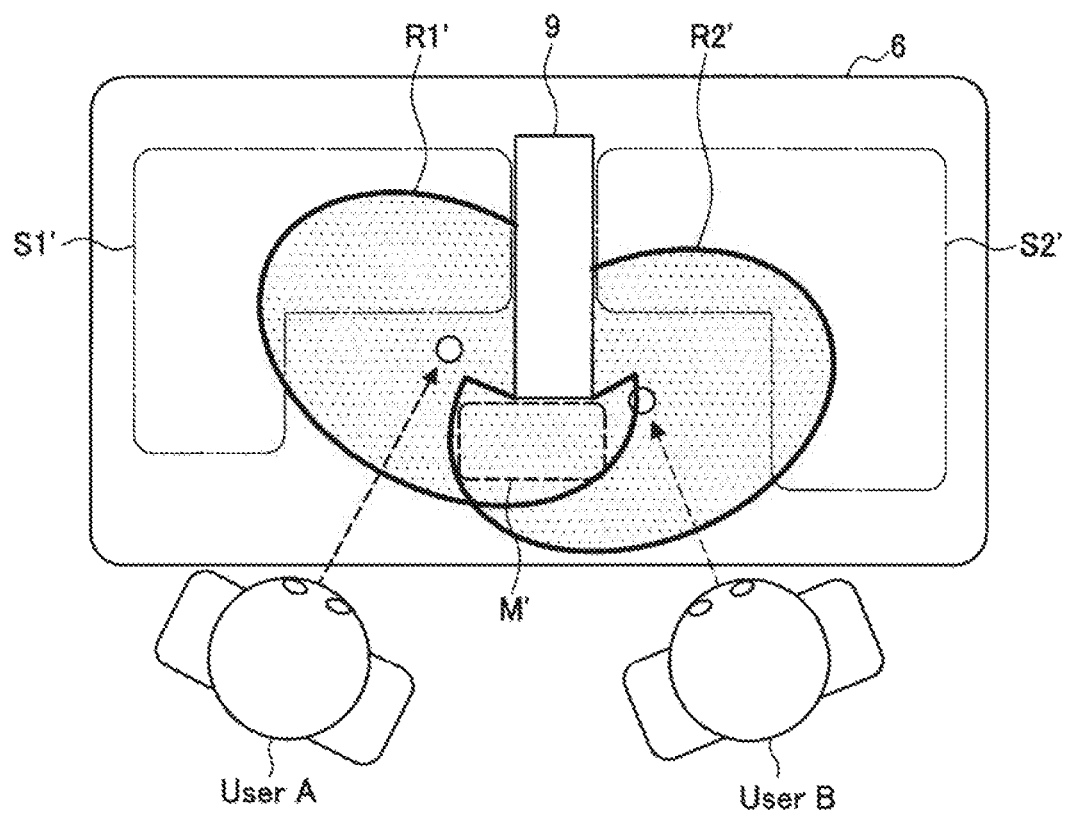
FIG. 13 is a diagram showing an outline of area determination considering object recognition according to a modification example of this embodiment.

FIG. 13 is a diagram showing an outline of area determination considering object recognition according to the modification example of this embodiment. As shown in FIG. 13, in the case where an object 9 exists on the table top 6, a field of view of each user is blocked by the object 9 depending on a height of the object 9. For example, the user A cannot see an opposite side of the object 9 (user B side), and the user B cannot see an opposite side of the object 9 (user A side). Therefore, readable areas of the users are different from the readable areas R1 and R2 shown in FIG. 8 and are readable areas R1' and R2' obtained by removing the regions on the opposite sides of the object 9 as shown in FIG. 13.

As described above, when the readable areas R1' and R2' are changed, a shared area M' is also changed because a region in which the readable areas are overlapped is also different. Further, confidential areas S1' and S2' of the respective users are also changed in accordance with a change in the readable areas R1' and R2'. Area determination processing considering such object recognition on the table top 6 will be described with reference to FIG. 14.

<5-2. Operation Processing>

Figure 14:
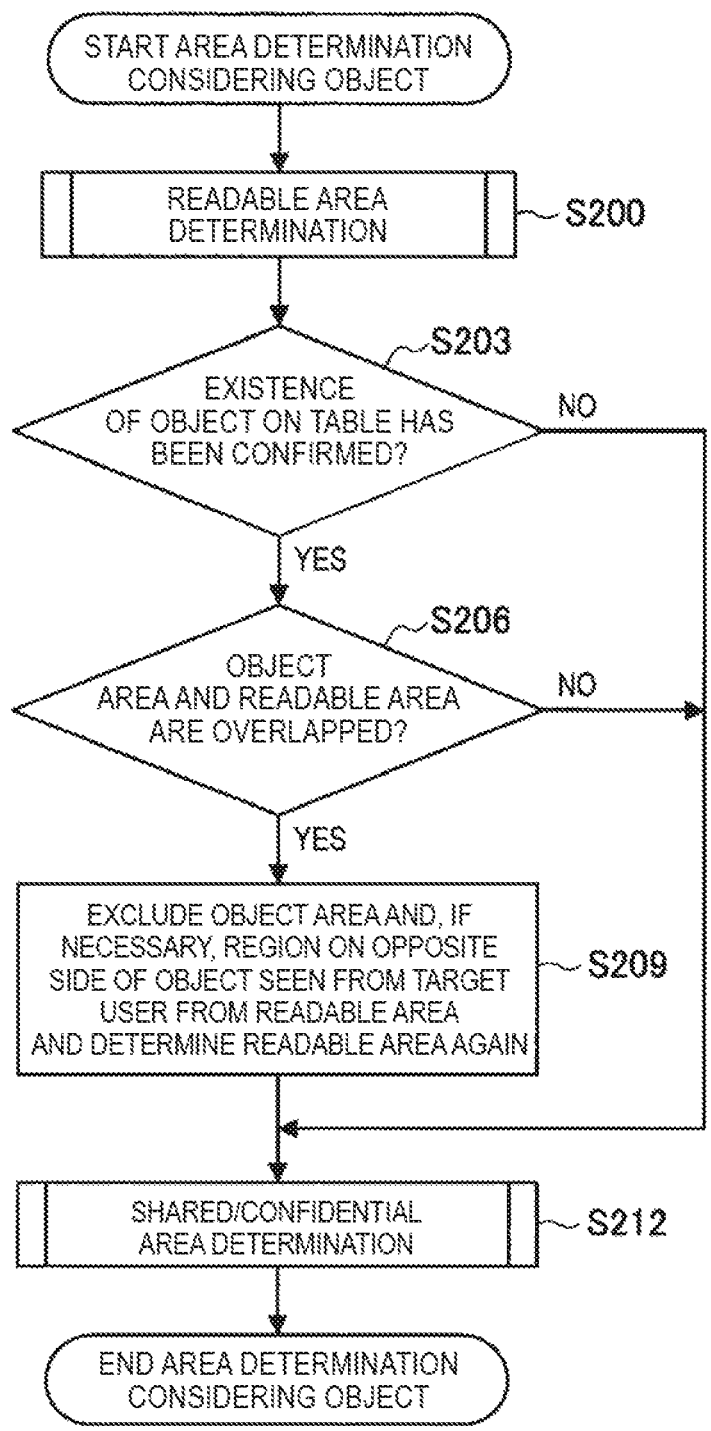
FIG. 14 is a flowchart showing area determination processing considering an object according to the modification example of this embodiment.

FIG. 14 is a flowchart showing the area determination processing considering an object according to the modification example of this embodiment. As shown in FIG. 14, first, in Step S200, the area determination unit 10b of the information processing apparatus 1 performs normal readable area determination processing. The normal readable area determination processing is specifically the determination processing that has been described with reference to FIG. 4.

Next, in Step S203, the area determination unit 10b determines whether or not an object exists on the table top 6. Object recognition is performed on the basis of, for example, a captured image acquired by the image pickup device 2. At this time, the area determination unit 10b recognizes a position, a size, a height, and the like of the object.

Then, in the case where it is determined that an object exists (S203/Yes), the area determination unit 10b determines whether or not an object area and a readable area are overlapped in Step S206. The object area is a region in which the object 9 and the table top 6 are brought into contact with each other.

Then, in the case where it is determined that the object area and the readable area are overlapped (S206/Yes), the area determination unit 10b excludes the object area and, if necessary, a region on the opposite side of the object 9 seen from a target user from the readable area and determines the readable area again in Step S209. In the case where the object 9 is high, a line of sight of the user is blocked, and therefore not only the object area (region hidden by the object 9) but also the opposite side of the object 9 cannot be seen. Therefore, the area determination unit 10b adjusts the readable area of the target user in consideration of the position and the height of the object 9, a positional relationship between the object 9 and the target user, and the like.

Then, in Step S212, the area determination unit 10b performs the shared/confidential area determination processing that has been described with reference to FIG. 7.

As described above, in the modification example of this embodiment, it is possible to determine each area also in consideration of an object placed on the table top.

6. Conclusion

As described above, in the control system according to the embodiments of the present disclosure, it is possible to differentiate between an area that can be visually recognized only by a specified user (confidential area) and an area that can be visually recognized by all users (shared area) on the information presentation surface (for example, table top 6) which is simultaneously viewed by a plurality of people. In addition, it is possible to ensure security while regarding convenience of joint viewing by a plurality of people as important by performing information presentation control in accordance with a characteristic of each area.

The preferred embodiment(s) of the present disclosure has/have been described above with reference to the accompanying drawings, whilst the present technology is not limited to the above examples. A person skilled in the art may find various alterations and modifications within the scope of the appended claims, and it should be understood that they will naturally come under the technical scope of the present disclosure.

For example, a computer program for exerting a function of the information processing apparatus 1 can be prepared in hardware such as the CPU, the ROM, and the RAM included in the above information processing apparatus 1. Further, a computer readable storage medium in which the computer program is stored is also provided.

In the case where content cannot be optimally displayed because a shared area is small, the output control unit 10d may perform control so that a copy of the same content is presented in the confidential area of each user.

The information presentation surface is not limited to the table top 6 and may be, for example, a wall surface.

The line-of-sight detection unit 10a may dynamically switch sensing information (captured image, sound data, and the like) for use in detection of a line of sight of a user. With this, it is possible to reduce a change in line-of-sight detection accuracy caused by a sensing situation.

Further, the effects described in this specification are merely illustrative or exemplified effects, and are not limitative. That is, with or in the place of the above effects, the technology according to the present disclosure may achieve other effects that are clear to those skilled in the art based on the description of this specification. Additionally, the present technology may also be configured as below.

(1)

An information processing apparatus, including:
a line-of-sight detection unit configured to detect lines of sight of a plurality of users with respect to presentation information; and
an area determination unit configured to determine, on the basis of the detected lines of sight of the plurality of users, a shared area that is visually recognized by the plurality of users to share information and a confidential area that is not visually recognized by another user to keep information of each user confidential.

(2)

The information processing apparatus according to (1), wherein, on a presentation surface of the presentation information, the area determination unit determines a region in which field-of-view ranges based on the detected lines of sight of the plurality of users are overlapped as the shared area and determines a region in which the field-of-view ranges of the plurality of users are not overlapped as the confidential area.

(3)

The information processing apparatus according to (2), wherein the confidential area is further determined as a region within a certain distance from a target user.

(4)

The information processing apparatus according to (2) or (3), wherein the confidential area is further determined as a region separated by a certain distance from the shared area.

(5)

The information processing apparatus according to any one of (2) to (4), wherein the area determination unit adjusts a size of the field-of-view range of each user in accordance with user context of each user.

(6)

The information processing apparatus according to (5), wherein the user context indicates what a user is looking at and is estimated on the basis of movement of the line of sight of the user.

(7)

The information processing apparatus according to any one of (1) to (6), further including an output control unit configured to perform output control of the presentation information presented on a presentation surface in accordance with a result of determination performed by the area determination unit.

(8)

The information processing apparatus according to (7), wherein, in the case where information that needs to be secured is opened, the output control unit performs control in a manner that the information is presented in the confidential area.

(9)

The information processing apparatus according to (7) or (8), wherein the output control unit performs control in a manner that information is presented in the confidential area with a low resolution.

(10)

The information processing apparatus according to any one of (7) to (9), wherein, in the case where information presented in the shared area is moved to a confidential area of the user by user operation, the output control unit performs control in a manner that the information is copied and is presented in the confidential area.

(11)

The information processing apparatus according to any one of (7) to (10), wherein, in the case where information presented in the confidential area is moved to the shared area by user operation, the output control unit performs control in a manner that the information is copied, is changed to have a size and a resolution suitable for shared viewing, and is then presented in the confidential area.

(12)

The information processing apparatus according to any one of (7) to (11), wherein, in the case where information presented in the confidential area is moved to the shared area by user operation, the output control unit performs control in a manner that the information is copied, confidential information contained in the copied information is hidden or deleted, and then the information is presented in the confidential area.

(13)

The information processing apparatus according to any one of (1) to (12), wherein the line-of-sight detection unit detects a line of sight on the basis of a line-of-sight direction, a head direction, or a posture of the user.

(14)

The information processing apparatus according to (13), wherein the line-of-sight direction, the head direction, or the posture of the user is estimated on the basis of at least one of a captured image of the user captured by an image pickup device and sound data of the user picked up by a sound pickup device.

(15)

The information processing apparatus according to (7), wherein the output control unit performs information display control on a display screen or information projection control on a plane of projection.

(16)

The information processing apparatus according to (15), wherein the display screen or the plane of projection is a table top.

(17)

The information processing apparatus according to (7), wherein the output control unit performs output control of sound having directionality from a speaker.

(18)

The information processing apparatus according to (2), wherein the area determination unit adjusts a size of the field-of-view range of each user in accordance with a recognition result of an object existing on the presentation surface.

(19)

A control method, including:

detecting lines of sight of a plurality of users with respect to presentation information; and determining, on the basis of the detected lines of sight of the plurality of users, a shared area that is visually recognized by the plurality of users to share information and a confidential area that is not visually recognized by another user to keep information of each user confidential.

REFERENCE SIGNS LIST 1 information processing apparatus
10 control unit
10a line-of-sight detection unit
10b area determination unit
10c user context estimation unit
10d output control unit
11 communication unit
13 storage unit
14 projection unit
2, 2a to 2b image pickup device
3, 3a to 3b speaker 4, 4a to 4b microphone
5 ceiling hanging unit
6 table top
7 network
8 content DB
9 object
M shared area
S confidential area
R readable area

What is claimed is:

1. An information processing apparatus, comprising:
at least one processor configured to:
acquire visible area information of a visible area of a user of a plurality of users with respect to a presentation surface;
determine an object placed on the presentation surface;
correct the visible area information based on each of a position of the object on the presentation surface and a height of the object;
determine, on the presentation surface, a shared area for the plurality of users and a confidential area for the user, based on the corrected visible area information;
control display of content including share information and confidential information, wherein
the confidential information is displayed in the confidential area,
the share information is displayed in the shared area,
the share information not being needed to be secured, and
the confidential information being needed to be secured in the shared area;
determine a movement of the content including the share information and the confidential information from the confidential area to the shared area; and
control, based on the determination of the movement of the content, non-display of at least a part of the confidential information to one of hide or delete the part of confidential information.

2. The information processing apparatus according to claim 1, wherein the at least one processor is further configured to control the non-display of at least the part of the confidential information to fill in at least a part of the shared area where the confidential information is displayed.

3. The information processing apparatus according to claim 2, wherein the at least one processor is further configured to control the non-display of at least the part of the confidential information to fill in at least the part of the shared area with a specific color.

4. The information processing apparatus according to claim 1, wherein
the at least one processor is further configured to control display of a switching button,
the displayed switching button is configured to switch a display state of the confidential information between a first display state and a second display state,
the first display state is a display state in which the confidential information is displayed in the shared area, and
the second display state is a display state in which the confidential information is not displayed in the shared area.

5. The information processing apparatus according to claim 4, wherein the at least one processor is further configured to authorize the user to control the switching button.

6. The information processing apparatus according to claim 5, wherein the at least one processor is further configured to change an information volume based on the determination of the movement of the content of the user from the confidential area to the shared area.

7. The information processing apparatus according to claim 6, wherein the at least one processor is further configured to control the movement of the content between the shared area and the confidential area based on a user input.

8. The information processing apparatus according to claim 1, wherein the shared area is visible to the plurality of users.

9. The information processing apparatus according to claim 1, wherein the object is one of a PC or a book.

10. A method, comprising:
acquiring visible area information of a visible area of a user of a plurality of users with respect to a presentation surface;
determining an object placed on the presentation surface;
correcting the visible area information based on each of a position of the object on the presentation surface and a height of the object;
determining, on the presentation surface, a shared area for the plurality of users and a confidential area for the user, based on the corrected visible area information;
controlling display of content including share information and confidential information, wherein
the confidential information is displayed in the confidential area,
the share information is displayed in the shared area,
the share information not being needed to be secured, and
the confidential information being needed to be secured in the shared area;
determining a movement of the content including the share information and the confidential information from the confidential area to the shared area; and
controlling, based on the determination of the movement of the content, non-display of at least a part of the confidential information to one of hide or delete the part of confidential information.

11. A non-transitory computer-readable medium having stored thereon, computer-executable instructions, which when executed by a processor of a first information processing device, cause the processor to execute operations, the operations comprising:
acquiring visible area information of a visible area of a user of a plurality of users with respect to a presentation surface;
determining an object placed on the presentation surface;
correcting the visible area information based on each of a position of the object on the presentation surface and a height of the object;
determining, on the presentation surface, a shared area for the plurality of users and a confidential area for the user, based on the corrected visible area information;
controlling display of content including share information and confidential information, wherein
the confidential information is displayed in the confidential area,
the share information is displayed in the shared area,
the share information not being needed to be secured, and
the confidential information being needed to be secured in the shared area;
determining a movement of the content including the share information and the confidential information from the confidential area to the shared area; and controlling, based on the determination of the movement of the content, non-display of at least a part of the confidential information to one of hide or delete the part of confidential information.

* * * * *